United States Patent

Smith

[11] Patent Number: 6,147,702
[45] Date of Patent: Nov. 14, 2000

[54] CALIBRATION OF DIGITAL CAMERAS

[75] Inventor: Ronald D. Smith, Phoenix, Ariz.

[73] Assignee: Intel Corporation, Santa Clara, Calif.

[21] Appl. No.: 09/062,262

[22] Filed: Apr. 17, 1998

[51] Int. Cl.[7] .................................................. H04N 15/00
[52] U.S. Cl. ........................ 348/41; 354/59; 354/287; 354/295; 250/494; 250/495
[58] Field of Search .............................. 348/41, 187, 268, 348/334; 396/71, 177

[56] References Cited

U.S. PATENT DOCUMENTS

| | | | |
|---|---|---|---|
| 4,381,890 | 5/1983 | Wallace | 354/59 |
| 4,473,289 | 9/1984 | Wallace | 354/476 |
| 4,739,394 | 4/1988 | Oda et al. | 358/29 |
| 5,541,656 | 7/1996 | Kare et al. | 348/334 |
| 5,619,029 | 4/1997 | Roxby et al. | 235/472 |
| 5,701,015 | 12/1997 | Lungershausen et al. | 250/495.1 |
| 5,740,480 | 4/1998 | Kuhn, Jr. et al. | 396/177 |
| 5,781,807 | 7/1998 | Glassgold et al. | 396/71 |
| 5,808,669 | 9/1998 | Schmutz et al. | 348/97 |
| 5,818,525 | 10/1998 | Elabd | 348/268 |
| 5,821,993 | 10/1998 | Robinson | 348/187 |
| 5,918,192 | 6/1999 | Tomaszewski | 348/231 |

FOREIGN PATENT DOCUMENTS

| | | |
|---|---|---|
| 0 222 548 A2 | 5/1987 | European Pat. Off. . |
| 0 754 994 A2 | 1/1997 | European Pat. Off. . |
| 0 755 151 A2 | 1/1997 | European Pat. Off. . |

OTHER PUBLICATIONS

PCT International Search Report, PCT/US99/08035.
Stephen Wadle et al., "Holographic Diffusers," Optical Engineering, vol. 33, No. 1, Jan. 1, 1994, pp. 213–218, XP000421283 ISSN: 0091–3286.

*Primary Examiner*—Howard Britton
*Assistant Examiner*—Shawn S. An
*Attorney, Agent, or Firm*—Trop, Pruner & Hu, P.C.

[57] ABSTRACT

A lens cover for a digital camera provides a diffused light source for calibration purposes which approximates a flat field light source. In this way, digital cameras may be calibrated in the field under user control. The diffuser may be in the form of a light transmissive hologram. The hologram may have formed thereon a plurality of light diffusing shapes. The camera may be calibrated either by itself or advantageously when connected to a host computer. The user may be prompted through the calibration sequence.

8 Claims, 3 Drawing Sheets

CALIBRATION OF DIGITAL CAMERAS

BACKGROUND

This invention relates generally to calibrating digital cameras.

Digital cameras may use a solid state sensor as the imaging array. Typical solid state sensors include charged coupled devices and active pixel sensors. Cameras using solid state sensors are subject to photo response nonuniformity (PRNU) and defective pixel maps. Photo response non-uniformity is systematic and is largely due to small variations in device processing across a particular imaging array. The non-uniformity introduces noise to the resulting picture. However, since the noise is systematic, it can be cancelled out following an appropriate calibration procedure.

Similarly, the imaging array may have defective pixels or elements and if the number of defective elements is not too great, the imaging array may still be useable. For example, calibration techniques can be utilized to overcome the effect of a relatively small number of defective elements in the imaging array.

There are a number of problems with calibrating digital cameras at the factory. For one thing, the quality of the calibration technique is to some degree a function of how much time is used to accomplish the calibration. The ideal calibration involves analyzing a large number of images and extracting the non-uniformity noise from other noise sources so that the total system noise is reduced. Thus, the more images that are analyzed the greater the likelihood that camera noise and photon shot noise may be eliminated so that photo response non-uniformity may be isolated and calibrated out. Of course, expending more time during factory calibration, results in increasing expense to the user.

In addition, it is difficult to convey the PRNU cancellation information to the user since the calibration data consists of a relatively large file of noise information. Generally, noise data cannot be readily compressed and therefore it would be necessary for the factory to convey a relatively large file in (or with) the camera. This could result in ineffective use of the camera's memory and awkward user startup. Particularly in view of the fact that many digital cameras have relatively little onboard memory, it is not desirable to provide an extensive file of noise information in cameras with limited memory.

Of course, it is also possible that the user could attempt to self-calibrate the camera. One problem the user must face is that calibration techniques generally require a flat field light source. Generally, inexpensive flat field sources are not available. The absence of a flat field light source and the need for some sophistication, would likely limit the number of users who could effectively self-calibrate digital cameras.

Another issue impacting digital camera cost is the necessity for a relatively high percentage of the elements making up the imaging array to be properly functional. If a relatively small number of the individual elements making up the array are defective, this may not be noticeable. Defective array elements may be compensated for by the calibration process. The higher the required ratio of good array elements to the total number of elements in a given array, the higher the resulting manufacturing cost.

Thus, there is a continuing need to enable cost effective calibration of digital cameras. There is also a need for flat field calibration techniques that are applicable to use in the field. Similarly, there is a continuing need to enable manufacturers to decrease the required ratio of good elements to total elements in an imaging array while still producing fully adequate image quality in the resulting stored images.

SUMMARY

In accordance with one aspect of the present invention, a lens cover for covering the lens of a digital camera may include a diffuser which produces a diffused light source. The diffuser is connectable to the camera.

In accordance with another aspect of the present invention, a digital camera includes a housing and an imaging lens contained in the housing. A diffuser is removably positionable in front of the lens. A digital imaging device converts the image into a digital signal representation of the image which can be calibrated when the diffuser is connected to the housing over the lens.

DETAILED DESCRIPTION

Figure 1:
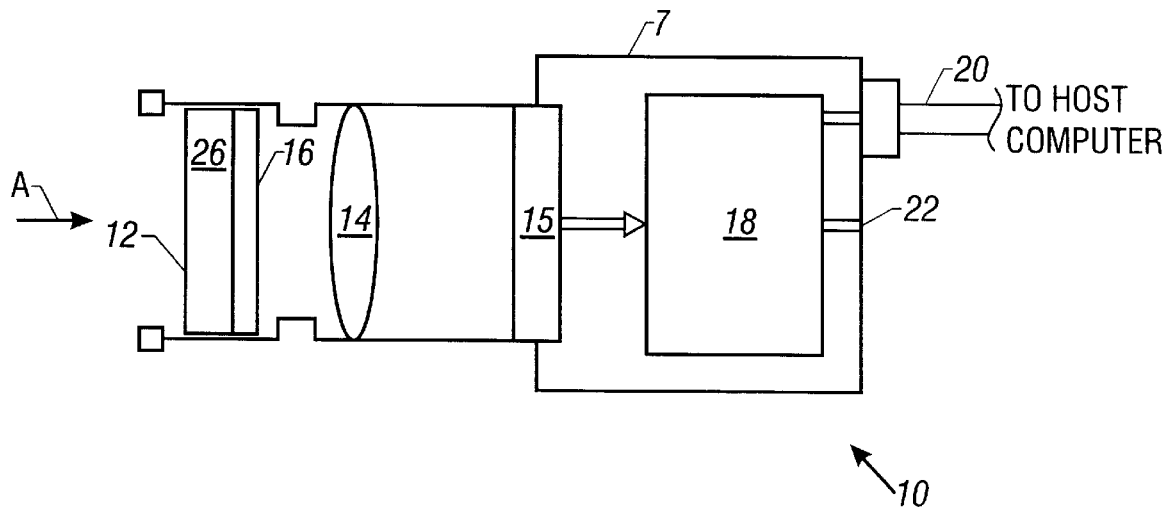
FIG. 1 is a schematic depiction of a digital camera in accordance with one embodiment of the present invention.

Referring to FIG. 1, a digital camera 10 includes a lens cover 12, a lens 14, a housing 7, and an image processor 18. The camera may be connected by bus 20 to a host computer. The camera 10 may be adapted to take still pictures, movies or both still pictures and movies.

The lens cover 12 may be implemented as a removable cover which is snapped onto the lens in a conventional fashion. Alternatively, any one of the variety of conventional mechanisms for displacing the cover 12 into position in front of the lens 14 may be used. The lens cover 12 protects the lens 14, prevents adverse UV effects on downstream components such as the imaging array 15 and the lens 14 and assists in calibration, in a fashion described hereinafter.

The imaging array 15 may be any conventional solid state imaging array including a charge coupled device (CCD) image array or a CMOS (Complementary Metal Oxide Semiconductor) imaging array which is sometimes also called an active pixel sensor (APS). The image processor 18 may include the necessary electronics to convert the information stored on the imaging array 15 into a digital signal, to process the signal, and to store the signal. For example, the processor 18 may include an LCD screen if desired, and it may interpolate missing color components, convert and compress signals, adjust the image based on calibration information and the like. The digital camera may work in a stand alone mode or it may be connectable to a host computer. It may also interact with external memory through a port 22. In this way, images may be captured, processed and stored.

The lens cover 12 includes a light transmissive support 26 and a diffuser 16. The diffuser 16 may be formed of any material capable of forming a sufficiently diffused light source. By "sufficiently diffused", it is intended to refer to the ability of the cover 12 to diffuse light sufficiently to create a sufficiently close approximation to a flat field to enable calibration of a camera.

Figure 2:
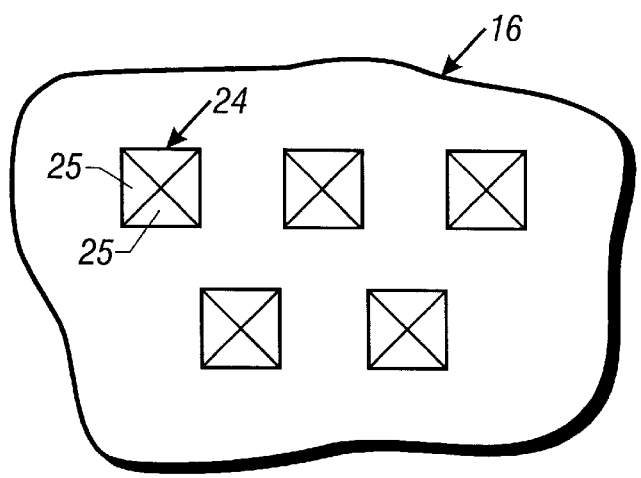
FIG. 2 is an enlarged view of a portion of one embodiment of the diffuser shown in FIG. 1.

One suitable implementation of the diffuser 16 is a light transmissive plastic film hologram formed with a pattern of light diffusing elements thereon. As shown in FIG. 2, one embodiment of the hologram includes a plurality of closely spaced conical shapes, such as the pyramid shapes 24. These pyramid shapes receive the incoming light, indicated as A, and diffuse the light in a variety of directions. This reflection may occur by reflecting the light off of the sides 25 of the shapes 24 so that a relatively uniform light source is created passing outwardly from the diffuser 16. The hologram may be formed on a thin plastic film using commercially available embossing equipment. It is desirable that the density of the diffusing shapes 24 be sufficient to create a relatively diffused light source which sufficiently emulates a flat field light source for camera calibration purposes.

The support 26 may be formed of any suitable light transmissive glass or plastic material. It functions to protect the lens 14 and the diffuser 16. The support 26 also supports the diffuser 16 when the diffuser 16 is formed from a plastic film hologram. In many embodiments it may be desirable to form the support 26 of a material that is UV absorbing to prevent UV damage to downstream components such as the lens 14 and the imaging array 15.

While the diffuser 16 is illustrated as being a plastic film hologram, other forms of holograms may be utilized as well. In addition, diffusers, such as frosted glass diffusers, may be suitable in particular applications.

While the diffuser 16 may not form a true flat field light source in the sense of a plurality of collinear light rays, through the creation of a relatively diffused pattern of light, an effect comparable to that of a flat field can be developed. This diffused light, which would impact the array 15 at a variety of random angles, sufficiently emulates a flat field to enable calibration.

Because the calibration is done in the field, for example by the user of the camera, it is not necessary to load the camera in the factory with a large amount of information related to calibration. In addition, the user can select the degree of calibration that the user desires to implement. In this way, an economical calibration system can be implemented. The manufacturer may also benefit by compensating for dead pixels through better calibration. This could mean cost savings in terms of lower imaging array discard rates.

Figure 3:
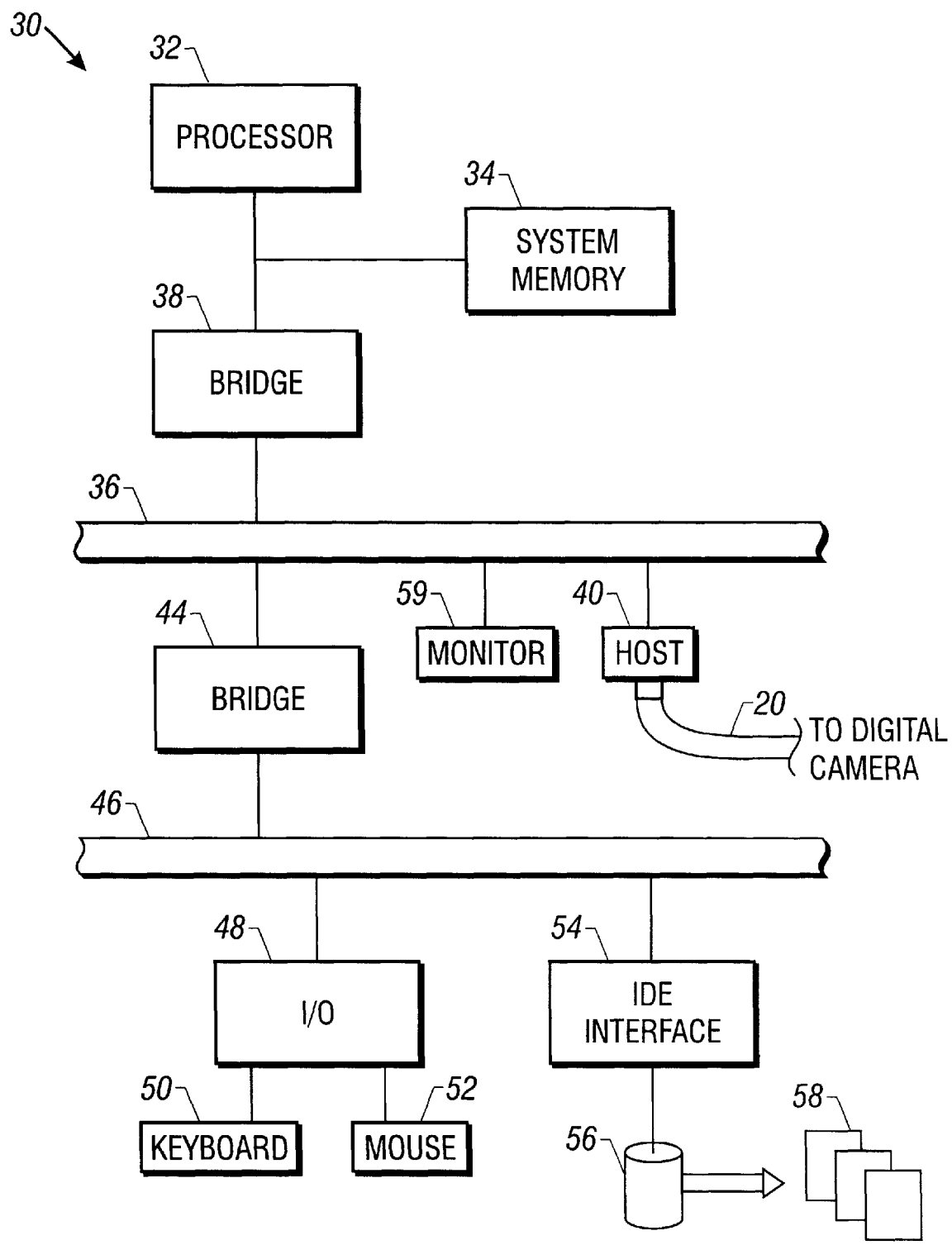
FIG. 3 is a block diagram of a host computer configured to implement one embodiment of the present invention.

Referring now to FIG. 3, an illustrative host computer 30 includes a processor 32 and a system memory 34. The processor 32 and system memory 34 are connected to a bus 36 by a bridge 38. An interface 40 for connection to a digital camera may be connected to the bus 36. For example, the interface 40 could be a host for a Universal Serial Bus (USB) 20 which connects to the bus 20 of the digital camera 10 (FIG. 1). A monitor 59 may also be connected to the bus 36. The bus 36 may connect through a bridge 44 to a bus 46. The bus 46 supports an input/output interface 48 which operates a keyboard 50 and a mouse 52. An interface 54 may be connected to the bus 36 which connects to a memory 56. The host computer memory 56 may include a number of application programs 58 including a digital camera installation and calibration program.

When it is desired to calibrate the digital camera 10, the camera may be connected to the host computer 30 as described above. The installation and calibration programs 58 may be installed into the memory 56 of the host computer and the application program 58 may be run to calibrate the camera 10. However, some cameras may calibrate themselves, without requiring a host computer.

Figure 4:
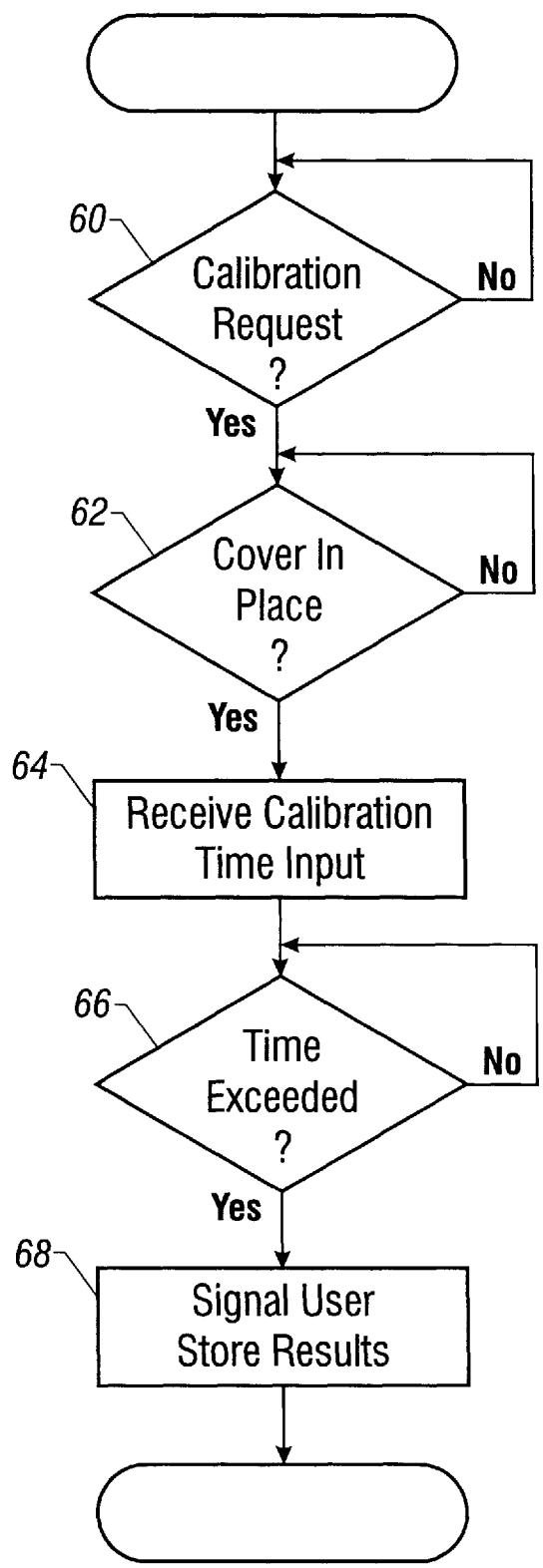
FIG. 4 is a flow diagram of a procedure implemented by the system shown in FIG. 1 for field calibration of digital cameras.

Referring to FIG. 4, the calibration program initially checks to determine whether or not a calibration request has occurred (diamond 60). If not, the program awaits a calibration request. Otherwise, the host prompts the user to determine whether the cover 12 is in place. This could be done by a message on the monitor 59. If the cover is not in place, the program awaits the user's positioning of the calibrating cover 12. Once the user indicates that the calibration cover is in place, the user may be prompted to input a calibration time as indicated in block 64. The user can indicate that the cover is on or provide a calibration time through the keyboard 50, for example. A default calibration time may be preloaded into the program.

The calibration time to some degree determines how many images are used for calibration and therefore the extent to which the photo response non-uniformity may be effectively eliminated.

The host computer 30 (or the camera itself) then determines whether the desired calibration time has been exceeded (diamond 66) and implements the calibration function using the image processor 18 in the camera 10. The user is signaled that the calibration is completed, as indicated in block 68, and the calibration results are stored in the camera and/or the host computer.

A number of images produced with the diffuser 16 may be analyzed and/or compared to other images. Assuming all elements in the imaging array 15 would be exposed to light g through the action of the diffuser 16, one can use an iterative process to eliminate other noise components to isolate the PRNU components. Thereafter, systematic noise from PRNU or dead pixels may be removed through the calibration process.

A digital camera can be calibrated to overcome the effects of photo response non-uniformity and defective pixels in a cost effective fashion. Moreover, the user can control the calibration process and can achieve a desired degree of calibration effectiveness based on the amount of time which the user is willing to invest. The manufacturer may benefit by providing higher quality cameras without incurring the expense of calibration and possibly through the use of imaging arrays with a higher percentage of defects (whose effect may be neutralized by the calibration process).

While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A digital camera comprising:

a housing;

an imaging lens contained in the housing;

a diffuser to create the effect of a flat field source, said diffuser removably positionable in front of the lens; and a digital imaging device that converts an image into a digital signal representation of the image, said digital imaging device having a calibration mode in which said digital imaging device is calibrated for photo response non-uniformity using said diffuser.

2. The camera of claim 1 wherein said diffuser includes a holographic plate adapted to diffuse light sufficiently to emulate a flat field source.

3. The camera of claim 2 wherein said holographic plate is formed of a plastic film secured to a light transmissive substrate.

4. The camera of claim 3 wherein said device includes an interface that receives instructions from a host computer.

5. A method of calibrating a camera having an imaging array comprising:

securing a diffuser to the camera;

emulating a flat field source using said diffuser; and implementing a calibration sequence using said emulated flat field source to calibrate the imaging array for photo response non-uniformity.

6. The method of claim 5 including prompting the user through the calibration sequence.

7. The method of claim 6 including receiving a user input indicating the amount of time desired for the calibration process.

8. The method of claim 5 including shining a light through said diffuser and causing the light to be diffused by a plurality of holographic shapes formed on said diffuser.

* * * * *